(12) United States Patent
Higurashi

(10) Patent No.: US 6,886,097 B1
(45) Date of Patent: Apr. 26, 2005

(54) METHOD AND APPARATUS FOR RECORDING AND REPRODUCING INFORMATION ON AND FROM RECORDING MEDIUM

(75) Inventor: Seiji Higurashi, Tokyo (JP)

(73) Assignee: Victor Company of Japan, Ltd., Yokohama (JP)

( * ) Notice: Subject to any disclaimer, the term of this patent is extended or adjusted under 35 U.S.C. 154(b) by 0 days.

(21) Appl. No.: 09/571,253

(22) Filed: May 16, 2000

(30) Foreign Application Priority Data

Jun. 22, 1999 (JP) .......................................... 11-176119

(51) Int. Cl.⁷ .......................... G06F 11/30; G06F 12/14; H04L 9/32
(52) U.S. Cl. ...................................... 713/193; 380/277
(58) Field of Search .................... 380/28, 277; 358/117, 358/124, 335; 713/193

(56) References Cited

U.S. PATENT DOCUMENTS

| | | | |
|---|---|---|---|
| 4,322,745 A | * 3/1982 | Saeki et al. .................. | 380/242 |
| 4,700,388 A | * 10/1987 | Okada et al. ................ | 380/235 |
| 5,323,244 A | * 6/1994 | Yamaguchi et al. .......... | 386/94 |
| 5,636,279 A | * 6/1997 | Katta et al. .................. | 380/217 |
| 5,774,548 A | * 6/1998 | Bando et al. ................ | 380/212 |

FOREIGN PATENT DOCUMENTS

| | | |
|---|---|---|
| EP | 0714204 | 5/1996 |
| EP | 0802535 | 10/1997 |
| JP | 10-55616 | 2/1998 |
| JP | 10-208386 | 8/1998 |

OTHER PUBLICATIONS

Kimura Takeshi, JP 08163119 A, "Scramble or Descramble Method and Scramble or Descramble Device for Packet Signal", Jun. 21, 1996.*
Nakamura Shinichi, EP 0939552 A2, "Scrambler, Descrambler and Recording Medium", Feb. 23, 1999.*

* cited by examiner

*Primary Examiner*—Gilberto Barrón
*Assistant Examiner*—Grigory Gurshman
(74) *Attorney, Agent, or Firm*—Louis Woo (57) ABSTRACT

A scrambling key information piece is periodically changed among a plurality of different key information pieces including first and second key information pieces. An input signal is scrambled into a scrambling-resultant signal in response to the periodically changed scrambling key information piece. The scrambling-resultant signal, the first key information piece, and the second key information piece are recorded on the recording medium. The first key information piece which is used in the scrambling of a portion of the input signal recorded during a first recording interval is recorded on the recording medium during a second recording interval being longer than the first recording interval and containing the first recording interval.

12 Claims, 6 Drawing Sheets

| 00 | NON SCRAMBLE |
| 01 | UNDEFINED |
| 10 | EVEN SCRAMBLE |
| 11 | ODD SCRAMBLE |

| SB# | CONTENTS |
|---|---|
| 6n | PC0 (PACK HEADER) |
| 6n+1 | PC1 |
| 6n+2 | PC2 |
| 6n+3 | PC3 |
| 6n+4 | PC4 |
| 6n+5 | PC5 |

METHOD AND APPARATUS FOR RECORDING AND REPRODUCING INFORMATION ON AND FROM RECORDING MEDIUM

BACKGROUND OF THE INVENTION

1. Field of the Invention

This invention relates to a method of recording information on a recording medium. Also, this invention relates to an apparatus for recording information on a recording medium. In addition, this invention relates to a method of reproducing information from a recording medium. Furthermore, this invention relates to an apparatus for reproducing information from a recording medium. In addition, this invention relates to a recording medium.

2. Description of the Related Art

It is known that original contents information is encrypted, and the encryption-resultant information is recorded on a recording medium such as a DVD (digital versatile disc). The encryption of the original contents information is responsive to key information. Generally, the key information is recorded on the recording medium in addition to the encryption-resultant information. During playback, the encryption-resultant information and the key information are reproduced from the recording medium. The reproduced encryption-resultant information is decrypted into the original contents information in response to the reproduced key information. For copy protection and security, it is desirable to inhibit the key information from being outputted from a reproducing apparatus.

SUMMARY OF THE INVENTION

It is a first object of this invention to provide an improved method of recording information on a recording medium.

It is a second object of this invention to provide an improved apparatus for recording information on a recording medium.

It is a third object of this invention to provide an improved method of reproducing information from a recording medium.

It is a fourth object of this invention to provide an improved apparatus for reproducing information from a recording medium. It is a fifth object of this invention to provide an improved recording medium.

A first aspect of this invention provides a method of recording a signal on a recording medium. The method comprises the steps of periodically changing a scrambling key information piece among a plurality of different key information pieces including first and second key information pieces; scrambling an input signal into a scrambling-resultant signal in response to the periodically changed scrambling key information piece; and recording the scrambling-resultant signal, the first key information piece, and the second key information piece on the recording medium; wherein the first key information piece which is used in the scrambling of a portion of the input signal recorded during a first recording interval is recorded on the recording medium during a second recording interval being longer than the first recording interval and containing the first recording interval.

A second aspect of this invention is based on the first aspect thereof, and provides a method further comprising the steps of generating first descrambling information in response to contents of the first key information piece and the second key information piece; generating second descrambling information representing which of the first key information piece and the second key information piece is used in the scrambling as the scrambling key information piece; and recording the first descrambling information and the second descrambling information on the recording medium together with the scrambling-resultant signal.

A third aspect of this invention is based on the second aspect thereof, and provides a method wherein the scrambling-resultant signal on the recording medium is divided into data blocks, and the first descrambling information is stored in auxiliary data areas in the data blocks and the second descrambling information is stored in data storing areas in the data blocks.

A fourth aspect of this invention is based on the second aspect thereof, and provides a method further comprising the steps of generating third descrambling information representing which of the first key information piece and the second key information piece the first descrambling information currently corresponds to; and adding the third descrambling information into the first descrambling information before the first descrambling information is recorded.

A fifth aspect of this invention is based on the first aspect thereof, and provides a method wherein the second recording interval is equal in length to a predetermined natural number "n" times the first recording interval, and the predetermined natural number "n" is equal to 2 or greater.

A sixth aspect of this invention provides a method of reproducing a signal from a recording medium, wherein a signal recorded on the recording medium includes a scrambling-resultant signal, first descrambling information, and second descrambling information, the scrambling-resultant signal resulting from scrambling of an original signal in response to a scrambling key information piece which is periodically changed among a plurality of different key information pieces, the second descrambling information representing which of the different key information pieces is used as the scrambling key information piece in the scrambling of a portion of the original signal recorded during a first recording interval, the first descrambling information representing contents of the key information piece used in the scrambling as the scrambling key information piece and also representing which of the different key information pieces the first descrambling information currently corresponds to, the first descrambling information being recorded during a second recording interval being longer than the first recording interval and containing the first recording interval. The method comprises the steps of reproducing the signal from the recording medium; detecting the first descrambling information in the signal reproduced from the recording medium; detecting the second descrambling information in the signal reproduced from the recording medium; generating descrambling keys in response to the detected first descrambling information; selecting one of the descrambling keys in response to the detected second descrambling information; separating the scrambling-resultant signal from the signal reproduced from the recording medium; and descrambling the separated scrambling-resultant signal in response to the selected descrambling key.

A seventh aspect of this invention provides an apparatus for reproducing a signal from a recording medium, wherein a signal recorded on the recording medium includes a scrambling-resultant signal, first descrambling information, and second descrambling information, the scrambling-resultant signal resulting from scrambling of an original signal in response to a scrambling key information piece which is periodically changed among a plurality of different key information pieces, the second descrambling information representing which of the different key information pieces is used as the scrambling key information piece in the scrambling of a portion of the original signal recorded during a first recording interval, the first descrambling information representing contents of the key information piece used in the scrambling as the scrambling key information piece and also representing which of the different key information pieces the first descrambling information currently corresponds to, the first descrambling information being recorded during a second recording interval being longer than the first recording interval and containing the first recording interval. The apparatus comprises means for reproducing the signal from the recording medium; means for detecting the first descrambling information in the signal reproduced from the recording medium; means for detecting the second descrambling information in the signal reproduced from the recording medium; means for generating descrambling keys in response to the detected first descrambling information; means for selecting one of the descrambling keys in response to the detected second descrambling information; means for separating the scrambling-resultant signal from the signal reproduced from the recording medium; and means for descrambling the separated scrambling-resultant signal in response to the selected descrambling key.

An eighth aspect of this invention provides a recording medium storing a signal including a scrambling-resultant signal, first descrambling information, and second descrambling information, the scrambling-resultant signal resulting from scrambling of an original signal in response to a scrambling key information piece which is periodically changed among a plurality of different key information pieces, the second descrambling information representing which of the different key information pieces is used as the scrambling key information piece in the scrambling of a portion of the original signal recorded during a first recording interval, the first descrambling information representing contents of the key information piece used in the scrambling as the scrambling key information piece and also representing which of the different key information pieces the first descrambling information currently corresponds to, the first descrambling information being recorded during a second recording interval being longer than the first recording interval and containing the first recording interval.

A ninth aspect of this invention provides an apparatus for recording a signal on a recording medium. The apparatus comprises first means for periodically changing a scrambling key information piece among a plurality of different key information pieces; second means for scrambling an input signal into a scrambling-resultant signal in response to the scrambling key information piece periodically changed by the first means; third means for generating descrambling information representing which of the different key information pieces is currently used by the first means as the scrambling key information piece; and fourth means for recording the scrambling-resultant signal, the different key information pieces, and the descrambling information on the recording medium.

A tenth aspect of this invention is based on the ninth aspect thereof, and provides an apparatus wherein each of the different key information pieces is used by the first means as the scrambling key information piece during a first time interval, and is recorded by the fourth means during a second time interval longer than the first time interval.

An eleventh aspect of this invention is based on the tenth aspect thereof, and provides an apparatus wherein the second time interval is equal in length to the first time interval multiplied by a total number of the different key information pieces.

A twelfth aspect of this invention provides a method of recording a signal on a recording medium. The method comprises the steps of periodically changing a scrambling key information piece among a plurality of different key information pieces; scrambling an input signal into a scrambling-resultant signal in response to the periodically changed scrambling key information piece; and recording the scrambling-resultant signal and the different key information pieces on the recording medium; wherein each of the different key information pieces which is used in the scrambling of a portion of the input signal recorded during a first recording interval is recorded on the recording medium during a second recording interval containing the first recording interval, and wherein the second recording interval is equal in length to the first recording interval multiplied by a total number of the different key information pieces.

DESCRIPTION OF THE PREFERRED EMBODIMENTS

First Embodiment

A video signal and an audio signal to be recorded are compressively encoded according to the MPEG2 standards. The encoding-resultant signal is scrambled (encrypted) in response to key information which is periodically changed between first and second different types at a predetermined period. For example, the predetermined period is chosen so that the key information of the first type is used during 10 seconds, and the key information of the second type is used during next 10 seconds. The scrambling-resultant signal is in the form of an MPEG2 transport stream (TS). The transport stream is recorded on a recording medium. The key information of the first type and the key information of the second type are added to the scrambling-resultant signal as first descrambling information (first decrypting information) before the scrambling-resultant signal is recorded. Second descrambling information (second decrypting information) is generated. The second descrambling information represents which of the first-type key information and the second-type key information is currently used in the scrambling.

The second descrambling information is added to the scrambling-resultant signal before the scrambling-resultant signal is recorded.

Figure 1:
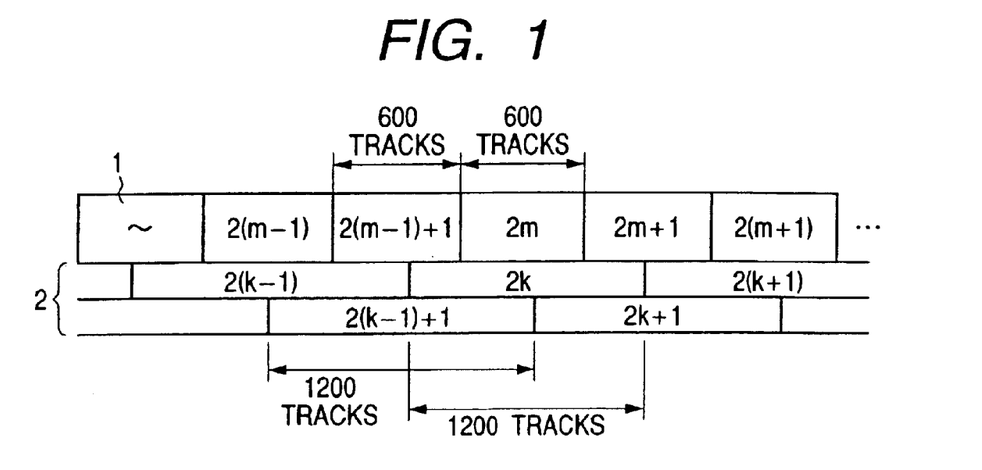
FIG. 1 is a diagram of the structure of a signal recorded on a recording medium in a first embodiment of this invention.

FIG. 1 shows the structure of information (a signal) recorded on the recording medium in a first embodiment of this invention. In FIG. 1, there are a TS recording portion 1 and a key information recording portion 2 which are separately illustrated for convenience' sake. In fact, the TS recording portion 1 and the key information recording portion 2 are mixed, or the key information recording portion 2 is contained in the TS recording portion 1.

The key information of one of the first type and the second type is odd-numbered key information while the key information of the other type is even-numbered key information. The odd-numbered key information and the even-numbered key information are alternately used at a predetermined alternation period. For example, the predetermined alternation period is chosen so that the odd-numbered key information is used during 10 seconds, and the even-numbered key information is used during next 10 seconds. Usually, the contents of the key information of one of the first type and the second type (the contents of the odd-numbered key information) are changed or updated as the key information is periodically used. Similarly, the contents of the key information of the other type (the contents of the even-numbered key information) are changed or updated. The key information of the first type and the key information of the second type will be used by a reproducing side as bases for generating descrambling keys (decrypting keys).

Figure 2:
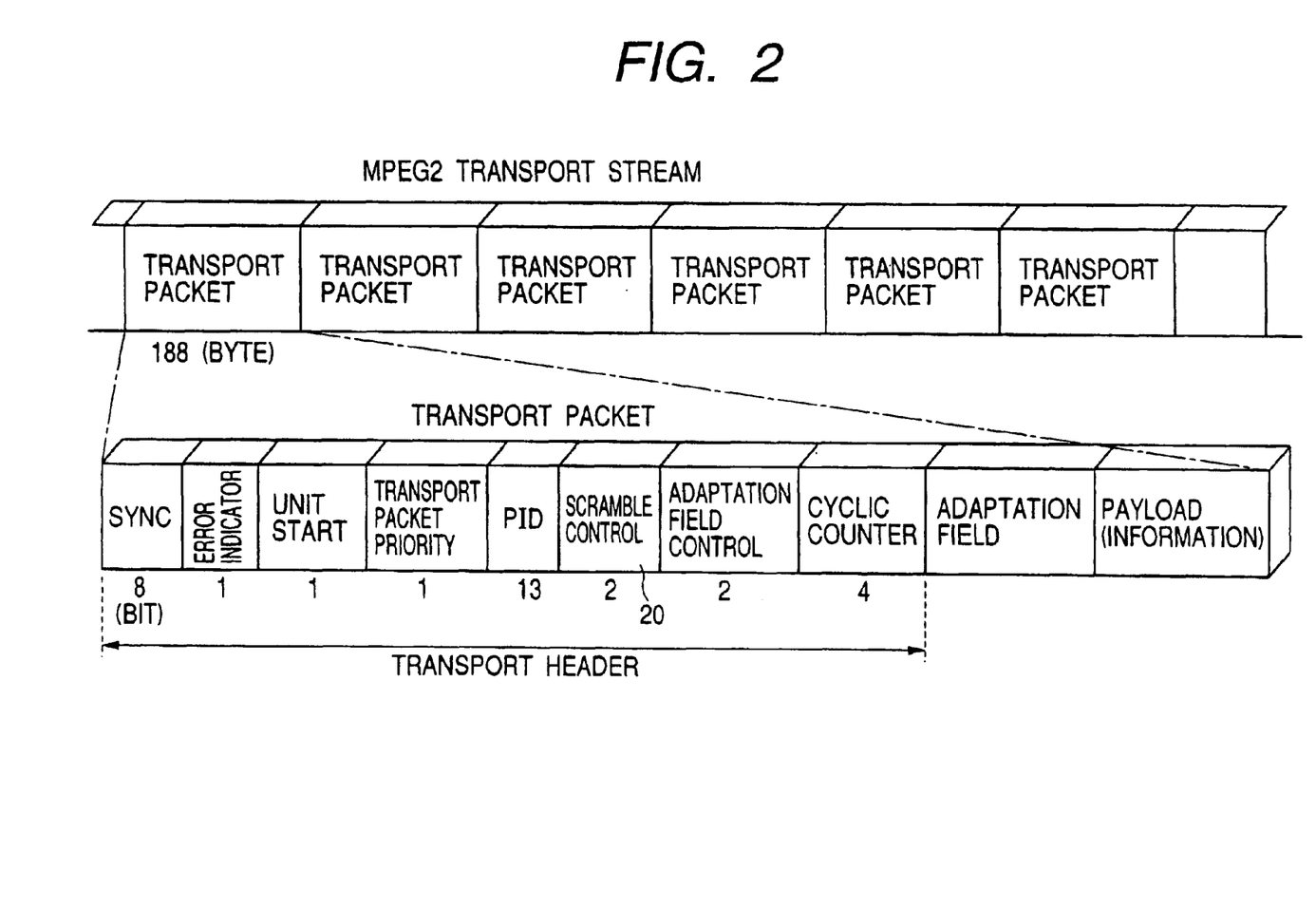
FIG. 2 is a diagram of the structure of an MPEG2 transport stream.

As shown in FIG. 2, an MPEG2 transport stream is a sequence of transport packets each having 188 bytes. Each transport packet is composed of a transport header, an adaptation field, and a payload (a contents-information area or a main information area) which are arranged in that order. The transport header has a sync byte. In the transport header, the sync byte is successively followed by a 1-bit data piece representing an error indicator, a 1-bit data piece representing a unit start indicator, a 1-bit data piece representing a transport packet priority, a 13-bit data piece representing a packet identifier (PID), a 2-bit data piece 20 related to scramble control, a 2-bit data piece related to adaptation field control, and a 4-bit data piece representing a cyclic counter.

The scramble-control data piece 20 represents whether or not transmitted contents information is scrambled. In the case where the scramble-control data piece 20 represents that transmitted contents information is scrambled, the scramble-control data piece 20 further indicates which of the key information of the first type and the key information of the second type is used in the scrambling, that is, which of the odd-numbered key information and the even-numbered key information is used in the scrambling. Thus, the scramble-control data piece 20 represents second descrambling information (second decrypting information) indicating which of the odd-numbered key information and the even-numbered key information is used in the scrambling. In each transport packet, the transport header is not scrambled while the adaptation field and the payload are scrambled in an encoding side or a recording side.

Odd-numbered scramble time intervals and even-numbered scramble time intervals alternate with each other. Each of the odd-numbered scramble time intervals and the even-numbered scramble time intervals has a predetermined length, for example, 10 seconds.

The key information of one of the first type and the second type is used in the odd-numbered scramble time intervals. The key information of the other type is used in the even-numbered scramble time intervals. The key information used in the odd-numbered scramble time intervals is referred to as the odd-numbered key information while the key information used in the even-numbered scramble time intervals is referred to as the even-numbered key information.

Figure 3:
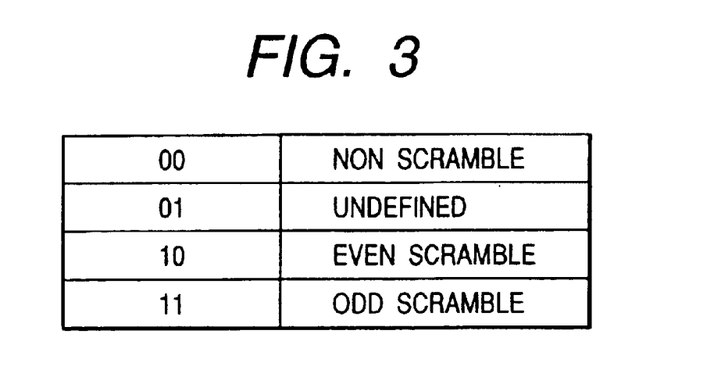
FIG. 3 is a diagram of the assignment of states of a scramble-control data piece to scrambling conditions.

With reference to FIG. 3, a "00" state of the scramble-control data piece 20 is assigned to "non-scramble" which means that transmitted contents information is not scrambled. A "01" state of the scramble-control data piece 20 is undefined. A "10" state of the scramble-control data piece 20 is assigned to "even scramble" which means that transmitted contents information is scrambled and the even-numbered key information is used in the scrambling. A "11" state of the scramble-control data piece 20 is assigned to "odd scramble" which means that transmitted contents information is scrambled and the odd-numbered key information is used in the scrambling.

As shown in FIG. 1, the TS recording portion 1 has a sequence of equal-size recording segments including recording segments $2(m-1)$, $2(m-1)+1$, $2m$, $2m+1$, $2(m+1)$, ... The even-numbered recording segments $2(m-1)$, $2m$, $2(m+1)$, ... correspond to "even scramble". On the other hand, the odd-numbered recording segments $2(m-1)+1$, $2m+1$, ... correspond to "odd scramble".

Each of the recording segments has a predetermined length, for example, 10 seconds. During every time interval corresponding to the length of one recording segment, a given number of recording tracks (for example, 600 recording tracks) are formed on the recording medium while the MPEG2 transport stream is recorded thereon.

As previously mentioned, the scramble-control data piece 20 represents the second descrambling information indicating which of the odd-numbered key information and the even-numbered key information is used in the scrambling. The scramble-control data piece 20 is recorded together with the scrambling-resultant signal.

In other words, the scramble-control data piece 20 is recorded while the scrambling-resultant signal is recorded.

As shown in FIG. 1, the key information recording portion 2 has a first sequence of equal-size recording segments loaded with the even-numbered key information and including recording segments $2(k-1)$, $2k$, $2(k+1)$, ... The recording segments $2(k-1)$, $2k$, $2(k+1)$, ... correspond to the TS recording segments $2(m-1)$, $2m$, $2(m+1)$, ..., respectively. For example, the information-key recording segment $2k$ starts at a position which precedes the starting point of the TS recording segment $2m$ by an interval corresponding to 300 recording tracks. The information-key recording segment $2k$ ends at a position which follows the ending point of the TS recording segment $2m$ by an interval corresponding to 300 recording tracks. Thus, the information-key recording segment $2k$ has a length which corresponds to 1,200 recording tracks, and which is equal to twice the length of the TS recording segment $2m$.

As shown in FIG. 1, the key information recording portion 2 has a second sequence of equal-size recording segments loaded with the odd-numbered key information and including recording segments $2(k-1)+1$, $2k+1$, ... The recording segments $2(k-1)+1$, $2k+1$, ... correspond to the TS recording segments $2(m-1)+1$, $2m+1$, ..., respectively. For example, the information-key recording segment $2k+1$ starts at a position which precedes the starting point of the TS recording segment $2m+1$ by an interval corresponding to 300 recording tracks. The information-key recording segment 2k+1 ends at a position which follows the ending point of the TS recording segment 2m+1 by an interval corresponding to 300 recording tracks. Thus, the information-key recording segment 2k+1 has a length which corresponds to 1,200 recording tracks, and which is equal to twice the length of the TS recording segment 2m+1.

Figure 4:
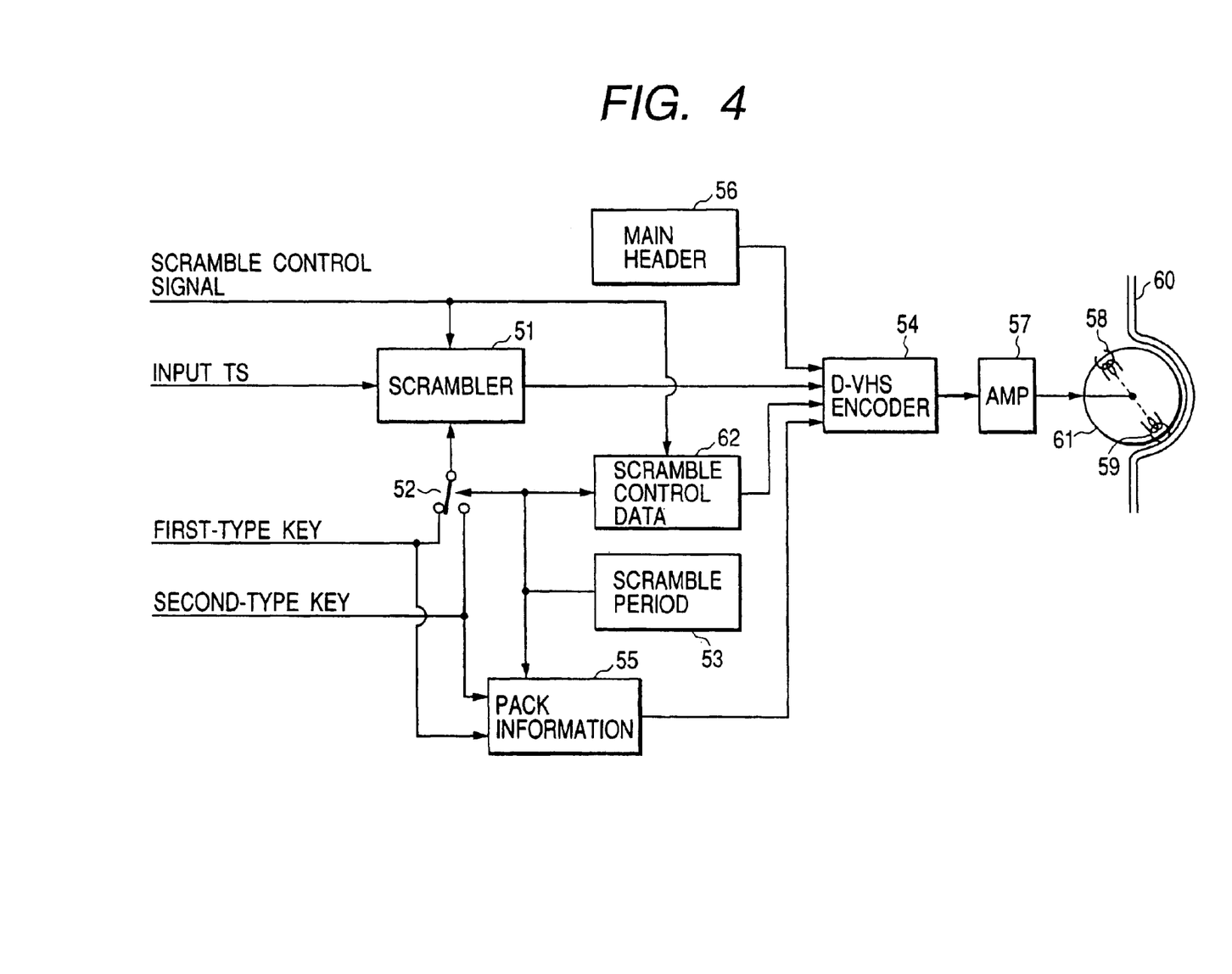
FIG. 4 is a block diagram of a recording apparatus in the first embodiment of this invention.

FIG. 4 shows a recording apparatus according to the first embodiment of this invention. The recording apparatus in FIG. 4 includes a scrambler (an encryptor) 51 and a switch 52. The scrambler 51 receives an input MPEG2 transport stream. The scrambler 51 receives a scramble control signal from a suitable device (not shown). The switch 52 receives the key information of the first type and the key information of the second type from suitable devices (not shown). The switch 52 receives a scramble period signal from a signal generator 53. The scramble period signal has a rectangular waveform and a predetermined period chosen so that the scramble period signal is in a first state during 10 seconds, and is in a second state during next 10 seconds. The switch 52 selects one of the first-type key information and the second-type key information in response to the scramble period signal, and transmits the selected key information to the scrambler 51. The scrambler 51 is selectively enabled and disabled in response to the scramble control signal. When being enabled, the device 51 scrambles (encrypts) the input MPEG2 transport stream in response to the key information fed via the switch 52. During the scrambling, the adaptation field and the payload in every transport packet in the input MPEG2 transport stream are scrambled while the transport header therein is not scrambled. The scrambler 51 outputs the scrambling-resultant MPEG2 transport stream to a D-VHS encoder 54. When the scrambler 51 is disabled, the input MPEG2 transport stream is transmitted to the D-VHS encoder 54 through the scrambler 51 without being processed.

A signal generator 55 receives the first-type key information and the second-type key information (the odd-numbered key information and the even-numbered key information). The signal generator 55 receives the scramble period signal from the signal generator 53. The signal generator 55 produces pack information in response to the first-type key information, the second-type key information, and the scramble period signal. The signal generator 55 outputs the pack information to the D-VHS encoder 54. The pack information indicates either at least part of the first-type key information or at least part of the second-type key information. In addition, the pack information indicates which of the first-type key information and the second-type key information the pack information currently corresponds to. In more detail, the pack information has a piece representing whether the key information in a related pack is of the first type or the second type.

A signal generator 56 produces main header information. The signal generator 56 outputs the main header information to the D-VHS encoder 54.

A signal generator 62 receives the scramble period signal from the signal generator 53. Also, the signal generator 62 receives the scramble control signal. The signal generator 62 periodically produces a scramble-control data piece 20 in response to the scramble period signal and the scramble control signal. The signal generator 62 outputs the scramble-control data piece 20 to the D-VHS encoder 54.

The device 54 encodes and multiplexes the scrambling-resultant MPEG2 transport stream (or the input MPEG2 transport stream), the pack information, the main header information, and the scramble-control data piece 20 into a signal of the D-VHS format. The D-VHS encoder 54 outputs the D-VHS signal to a recording amplifier 57. The device 57 amplifies the D-VHS signal. The amplification-resultant signal is transmitted from the recording amplifier 57 to magnetic heads 58 and 59 via rotary transformers (not shown). The magnetic heads 58 and 59 periodically and alternately record the amplification-resultant signal, that is, the output signal of the recording amplifier 57, on a magnetic tape 60.

The magnetic heads 58 and 59 differ from each other in azimuth angle. The magnetic heads 58 and 59 are mounted on the circumferential surface of a rotary drum 61. The rotary drum 61 is rotated by a suitable servo mechanism (not shown). The magnetic heads 58 and 59 rotate together with the rotary drum 61. The magnetic heads 58 and 59 are diametrically opposed to each other. In other words, the magnetic heads 58 and 59 are spaced by an angular interval of 180 degrees. The magnetic tape 60 is wrapped on the circumferential surface of the rotary drum 61 in an angular range of about 180 degrees along a part of helix. A suitable mechanism (not shown) feeds the magnetic tape 60 relative to the rotary drum 61 at a constant speed. Recording tracks are successively formed on the magnetic tape 60 while the output signal of the recording amplifier 57 is recorded alternately by the magnetic heads 58 and 59. The recording tracks are slant with respect to the longitudinal direction of the magnetic tape 60.

Figure 5:
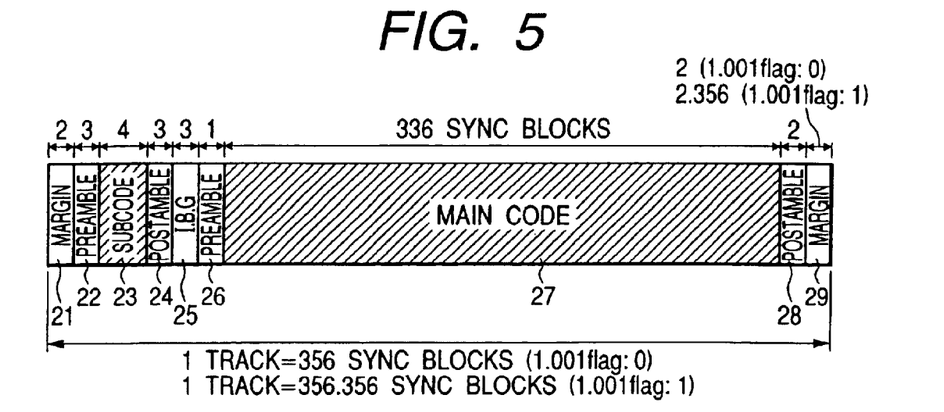
FIG. 5 is a diagram of the format of one recording track on a recording medium.

Each recording track on the magnetic tape 60 is composed of equal-size data blocks sequentially arranged in the direction of the scanning by the magnetic head 58 or 59. The data blocks are also referred to as the sync blocks (SB). As shown in FIG. 5, one recording track has a sequence of a front margin area 21 of 2 sync blocks, a preamble area 22 of 3 sync blocks, a sub code area 23 of 4 sync blocks, a post-amble area 24 of 3 sync blocks, an IBG area 25 of 3 sync blocks, a preamble area 26 of 1 sync block, a main code area (data area) 27 of 336 sync blocks, a post-amble area 28 of 2 sync blocks, and a rear margin area 29. The main code area 27 and the sub code area 23 can be used as information recording areas.

The speed of rotation of the rotary drum 61 can be changed by the servo mechanism between 30 rps and 29.97 rps. A "1.001" flag indicates whether the speed of rotation of the rotary drum 61 is equal to 30 rps or 29.97 rps. In the case where the "1.001" flag is in a state of "0", the rear margin area 29 is composed of 2 sync blocks. Thus, in this case, each recording track is formed by 356 sync blocks. In the case where the "1.001" flag is in a state of "1", the rear margin area 29 is composed of 2.356 sync blocks. Thus, in this case, each recording track is formed by 356.356 sync blocks. The sub code area 23 has a fixed length of 4 sync blocks and the main code area 27 has a fixed length of 336 sync blocks regardless of the state of the "1.001" flag. For example, each of 188-byte packets in the MPEG2 transport stream is recorded on two adjacent sync blocks in the main code area 27.

Figure 6:
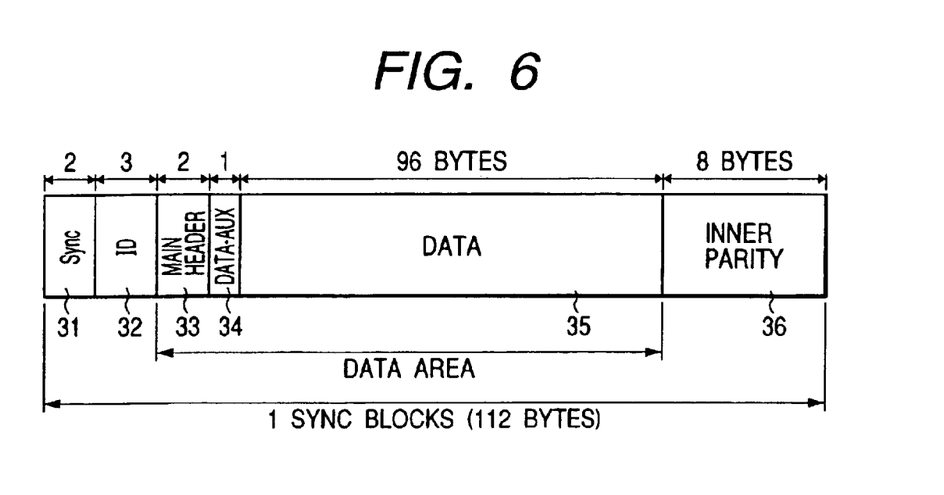
FIG. 6 is a diagram of the format of one data block (one sync block) in a main code area in FIG. 5.

As shown in FIG. 6, each of the sync blocks in the main code area 27 corresponds to 112 bytes in capacity (size), and has a sequence of sub areas 31, 32, 33, 34, 35, and 36. The first sub area 31 has 2 bytes, and stores a sync signal for enabling the present sync block to be reproduced. The second sub area 32 has 3 bytes, and stores address information. The address information is also referred to as the identification (ID) information. The third sub area 33 has 2 bytes, and stores main header information composed of information pieces of various types. The fourth sub area 34 has 1 byte. The fourth sub area 34 is an auxiliary data (DATA-AUX) area. The fifth sub area 35 has 96 bytes, and stores effective data or real data. The fifth sub area 35 is also referred to as the data storing area 35. The sixth sub area 36 has 8 bytes, and stores a signal of inner parities for correcting an error or errors in the information represented by the other sub areas 31–35.

The third, fourth, and fifth sub areas 33, 34, and 35 form a 99-byte data area in which the latter 96 bits compose the data storing area 35 assigned to effective information or real information (contents information).

The D-VHS encoder 54 is designed so that the scramble-control data piece 20 will be recorded on the data storing area 35, and the first-type key information and the second-type key information (the odd-numbered key information and the even-numbered key information) will be recorded on the auxiliary data (DATA-AUX) areas 34 in the sync blocks in the main code area 27 as a pack form.

Figure 7:
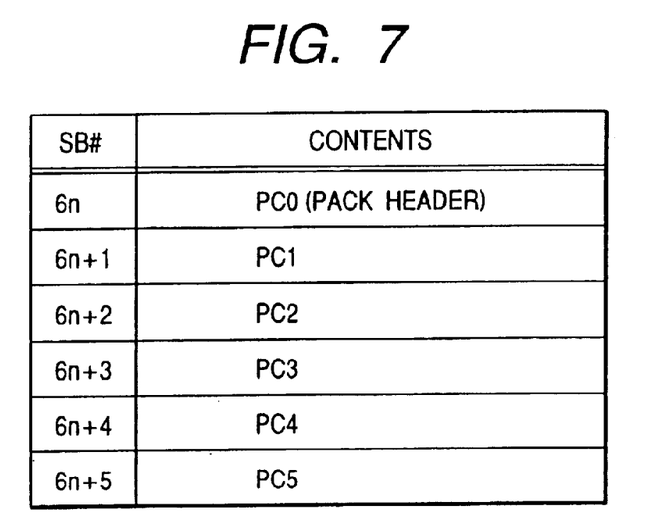
FIG. 7 is a diagram of the structure of one pack.

With reference to FIG. 7, the auxiliary data (DATA-AUX) areas 34 are separated into 6-byte groups loaded with 6-byte packs having a period corresponding to 6 sync blocks. Specifically, each group corresponding to each pack has the auxiliary data (DATA-AUX) areas 34 in six successive sync blocks. In each group (each pack), a pack header PC0 is recorded on the auxiliary data (DATA-AUX) area 34 in the first sync block 6$n$, and pack information pieces PC1, PC2, PC3, PC4, and PC5 are recorded on the auxiliary data (DATA-AUX) areas 34 in the second, third, fourth, fifth, and sixth sync blocks 6$n$+1, 6$n$+2, 6$n$+3, 6$n$+4, and 6$n$+5 respectively.

The pack header PC0 in which all bits are "1" indicates that the present pack represents scramble key information. The pack information piece PC1 in which the highest bit (MSB) is "0" indicates that the present pack represents the even-numbered key information. The pack information piece PC1 in which the highest bit (MSB) is "1" indicates that the present pack represents the odd-numbered key information. The 7 lower bits of the pack information piece PC1 indicate a page number. The pack information pieces PC2, PC3, PC4, and PC5 indicate the contents of the key information being a base for generating a descrambling key (a decrypting key).

In the case of one key information having 64 bytes, the key information is divided into sixteen 4-byte segments which are assigned to. 16 packs respectively. In these 16 packs, the 7 lower bits of the pack information pieces PC1 are between "00H" and "0FH" or between "80H" and "8FH". Here, "H" means hexadecimal notation. The 16 packs corresponding to one key information can thus be detected from among packs by referring to the states of the 7 lower bits of the pack information pieces PC1. Four bytes of each 4-byte segment is assigned to the pack information pieces PC2, PC3, PC4, and PC5 in the related pack, respectively.

For every recording track, the odd-numbered key information and the even-numbered key information are recorded in different packs respectively which are formed by ones selected from among the auxiliary data (DATA-AUX) areas 34 in the 336 sync blocks composing the main code area 27. As shown in FIG. 1, the odd-numbered key information having the same contents is repetitively recorded for 1,200 recording tracks. Similarly, the even-numbered key information having the same contents is repetitively recorded for 1,200 recording tracks. Usually, the contents of the odd-numbered key information are changed or updated for every 1,200 recording tracks. Also, the contents of the even-numbered key information are changed or updated for every 1,200 recording tracks.

Figure 8:
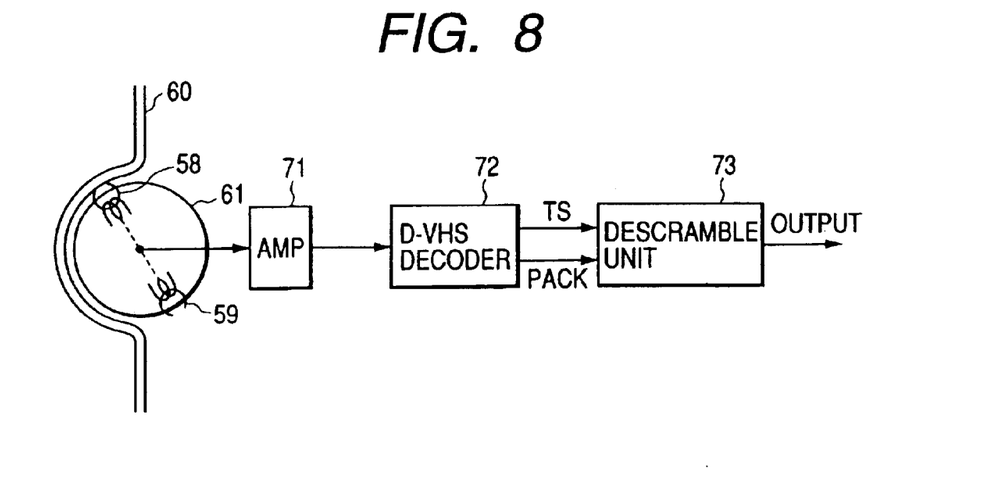
FIG. 8 is a block diagram of a reproducing apparatus in the first embodiment of this invention.

FIG. 8 shows a reproducing apparatus according to the first embodiment of this invention. The recording apparatus in FIG. 4 and the reproducing apparatus in FIG. 8 may be combined into a single VTR or VCR.

In the reproducing apparatus of FIG. 8, magnetic heads 58 and 59 on a rotary drum 61 alternately scan a magnetic tape 60, and reproduce a signal therefrom. The reproduced signal is transmitted from the magnetic heads 58 and 59 to a reproducing amplifier 71 via rotary transformers (not shown). The device 71 amplifies the reproduced signal. The reproducing amplifier 71 outputs the amplification-resultant signal to a D-VHS decoder 72. The device 72 decodes and demultiplexes the output signal of the reproducing amplifier 71 into an MPEG2 transport stream and pack information (a sequence of packs). The pack information comes from the auxiliary data (DATA-AUX areas 34 in selected ones of the 336 sync blocks composing the main code area 27 for every recording track. The D-VHS decoder 72 outputs the MPEG2 transport stream and the pack information to a descrambling unit (decrypting unit) 73.

Figure 9:
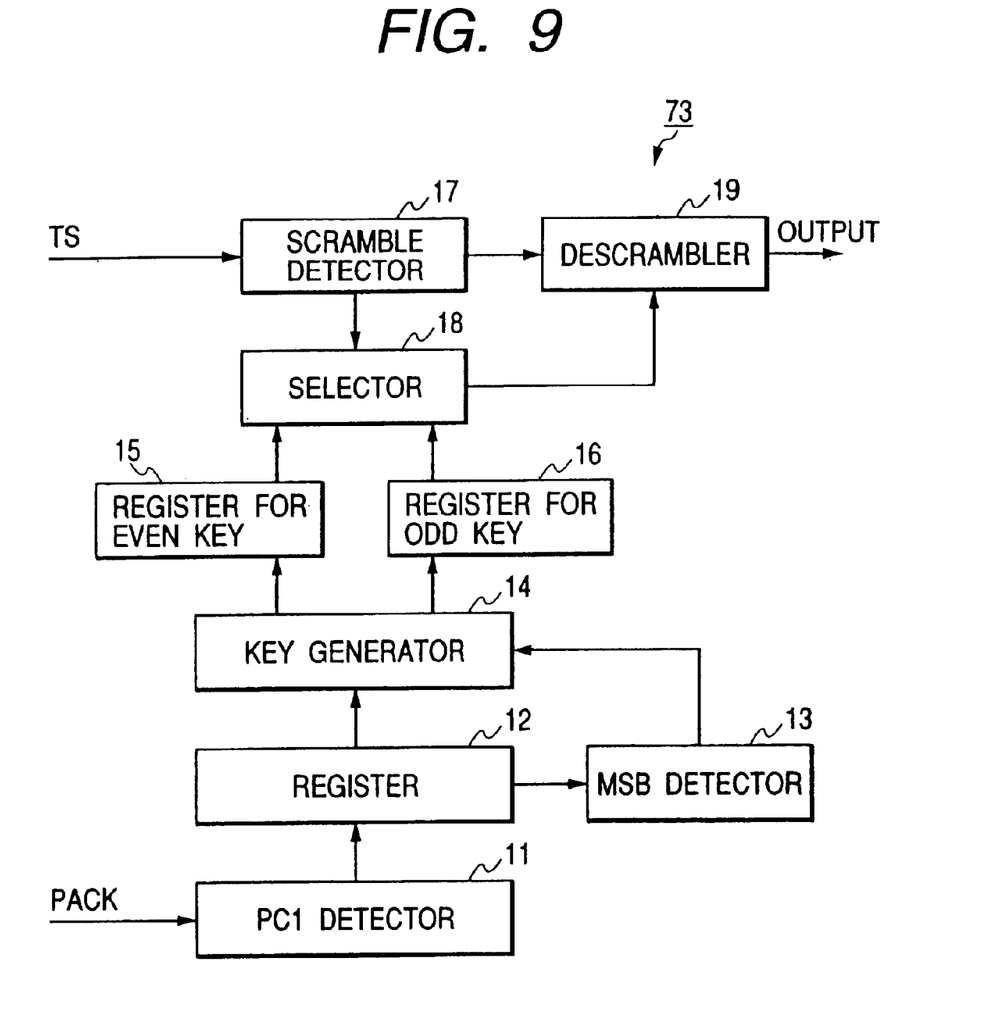
FIG. 9 is a block diagram of a descrambling unit in FIG. 8.

As shown in FIG. 9, the descrambling unit 73 includes a PC1 detector 11, a register 12, an MSB detector 13, a key generator 14, a register 15 for an even-numbered descrambling or decrypting key, a register 16 for an odd-numbered descrambling or decrypting key, a scramble detector 17, a selector 18, and a descrambler (decryptor) 19.

The PC1 detector 11 receives the pack information (the sequence of packs) from the D-VHS decoder 72. The PC1 detector 11 senses pack information pieces PC1 in packs fed from the D-VHS decoder 72. The PC1 detector 11 sequentially senses specified ones of packs in response to the sensed pack information pieces PC1. The specified packs contain key information. For example, the specified packs are in groups each corresponding to one key information. Every sensed specified pack is a pack having a pack header PC0 in which all bits are "1". The PC1 detector 11 loads the register 12 with the sensed pack (or the sensed packs corresponding to one key information). The MSB detector 13 accesses the highest bit (MSB) of the pack information piece PC1 in the pack in register 12. The MSB detector 13 decides whether the accessed highest bit is "1" or "0". The MSB detector 13 generates a signal representing the result of the decision. The MSB detector 13 outputs the decision-result signal to a key generator 14. The pack (or packs) is fed from the register 12 to the key generator 14.

The key generator 14 produces a signal of a descrambling key (decrypting key) in response to the pack information pieces PC2, PC3, PC4, and PC5 in the pack fed from the register 12. When the output signal of the MSB detector 13 represents that the highest bit (MSB) of the pack information piece PC1 is "0", the key generator 14 stores the signal of the descrambling key into the even-numbered-key register 15. When the output signal of the MSB detector 13 represents that the highest bit (MSB) of the pack information piece PC1 is "1", the key generator 14 stores the signal of the descrambling key into the odd-numbered-key register 16.

The scramble detector 17 receives the MPEG2 transport stream from the D-VHS decoder 72. The scramble detector 17 feeds the MPEG2 transport stream to the descrambler 19. In addition, the scramble detector 17 senses every scramble-control data piece 20 in the MPEG2 transport stream. The scramble detector 17 executes a decision as to the state of the scramble-control data piece 20. When the state of the scramble-control data piece 20 is "10", the scramble detector 17 controls the selector 18 to read out the signal of the descrambling key from the even-numbered-key register 15. The read-out signal of the descrambling key is transmitted from the selector 18 to the descrambler 19. When the state of the scramble-control data piece 20 is "11", the scramble detector 17 controls the selector 18 to read out the signal of the descrambling key from the odd-numbered-key register 16. The read-out signal of the descrambling key is transmitted from the selector 18 to the descrambler 19. When the state of the scramble-control data piece 20 is "00", the scramble detector 17 controls the selector 18 to inhibit the feed of the descrambling-key signal to the descrambler 19. Since the transport header in each transport packet which has the scramble-control data piece 20 is not scrambled, the scrambler detector 17 can directly derive the state of the scramble-control data piece 20.

In the case where the descrambler 19 receives the signal of the descrambling key from the selector 18, the device 19 descrambles or decrypts the MPEG2 transport stream in response to the descrambling key. The descrambler 19 outputs the descrambling-resultant MPEG2 transport stream (the decrypting-resultant MPEG2 transport stream). In the case where the descrambler 19 does not receive the signal of the descrambling key from the selector 18, the MPEG2 transport stream passes through the device 19 without being processed. Thus, in this case, the descrambler 19 outputs the MPEG2 transport stream as it is.

As shown in FIG. 1, during every 1,200-track-corresponding term from a moment preceding the starting point of the reproduction time of a TS segment by a 300-track-corresponding time interval to a moment following the ending point thereof by a 300-track-corresponding time interval, the key information used in the scrambling of the TS segment is continuously reproduced. Thus, even in the case where a slight phase error exists between the reproduced MPEG2 transport stream (TS) and the reproduced key information, at the moment of the feed of a TS segment to the descrambler 19, the descrambling key fed to the descrambler 19 surely corresponds to one related to the TS segment. Thus, it is possible for the descrambler 19 to implement a correct descrambling process.

As previously mentioned, the key information used in the scrambling is periodically changed between the first type and the second type. Specifically, the key information of the first type is used during 10 seconds, and the key information of the second type is used during next 10 seconds. The periodical change of the key information provides high-security scramble (high-security encryption). The key information is recorded on distant places in recording tracks. This recording form of the key information enhances the security of scramble (encryption). The key information is recorded separately from the contents information. Thus, it is possible to prevent the reproduced key information from being leaked out of the reproducing apparatus when the reproduced contents information is outputted from the reproducing apparatus.

As previously mentioned, the key information is divided into segments. The segments of the key information are placed in different sync blocks, respectively. The sync blocks loaded with the segments of the key information are recorded at intervals. Therefore, it is difficult to reproduce the key information by a stream analysis.

Second Embodiment

A second embodiment of this invention is similar to the first embodiment thereof except that first-type key information and second-type key information (odd-numbered key information and even-numbered key information) or scramble-control data pieces 20 recorded on sub code areas 23 in recording tracks (see FIG. 5).

Third Embodiment

A third embodiment of this invention is a modification of the first embodiment thereof. The third embodiment of this invention is designed so that a signal is recorded and reproduced on and from a recording medium such as an optical disc which differs from a magnetic tape.

Fourth Embodiment

A fourth embodiment of this invention is similar to the first embodiment thereof except that key information is changed among three or more different types. Each of the different types of the key information is used in scrambling a portion of contents information which is recorded during a first time interval. In addition, each of the different types of the key information is recorded during a second time interval which contains the first time interval. The second time interval is equal in length to the first time interval multiplied by the total number of the different types of the key information.

Fifth Embodiment

A fifth embodiment of this invention is similar to the first embodiment thereof except for design changes mentioned hereinafter. In the fifth embodiment of this invention, a key generator 14 (see FIG. 9) includes a ROM divided into different-address regions which store signals of descrambling keys (decrypting keys) respectively. Pack information pieces PC2, PC3, PC4, and PC5 in a pack fed from a register 12 compose an address signal applied to the ROM. One of the signals of the descrambling keys is read out from the ROM in accordance with the address signal before being outputted from the key generator 14.

What is claimed is:

1. A method of recording a signal on a recording medium, comprising the steps of:

periodically changing a scrambling key information piece among a plurality of different key information pieces including first and second key information pieces;

scrambling an input signal into a scrambling-resultant signal in response to the periodically changed scrambling key information piece; and recording a portion of the scrambling-resultant signal which results from the scrambling in response to the first key information piece on a first recording interval in other recording medium, recording a portion of the scrambling-resultant signal which results from the scrambling in response to the second key information piece on a second recording interval in the recording medium, recording the first key information, piece on the first and second recording intervals, and recording the second key information piece on the first recording interval, wherein the first and second recording intervals are different from each other.

2. A method as recited in claim 1, wherein the first and second recording intervals include an odd-numbered recording interval and an even-numbered recording interval, and the different key information pieces include a key information piece of an odd-numbered type used for the scrambling of a portion of the input signal which is assigned to the odd-numbered recording interval and a key information piece of an even-numbered type used for the scrambling of a portion of the input signal which is assigned to the even-numbered recording interval, and further comprising the steps of:

recording the periodically changed scrambling key information piece used for the scrambling on an auxiliary information area in the recording medium as at least a part of first descrambling information;

generating second descrambling information representing which of the key information piece of the odd-numbered type and the key information piece of the even-numbered type the periodically changed scrambling key information piece used for the scrambling corresponds to; and recording the second descrambling information on a data store area of the recording medium together with the scrambling-resultant signal wherein the data store area differs from the auxiliary information area.

3. A method as recited in claim 2, further comprising the step of making the first descrambling information represent which of the key information piece of the odd-numbered type and the key information piece of the even-numbered type the periodically changed scrambling key information piece used for the scrambling corresponds to.

4. A method as recited in claim 1, wherein the first key information piece is recorded on a zone in the recording medium, the zone covering the first recording interval and having a length equal to twice that of the first recording interval.

5. A method of reproducing a signal from a recording medium, wherein a signal recorded on the recording medium includes a scrambling-resultant signal, first descrambling information, and second descrambling information, the scrambling-resultant signal resulting from scrambling of an original signal in response to a scrambling key information piece which is periodically changed among a plurality of different key information pieces, the second descrambling information representing which of the different key information pieces is used as the scrambling key information piece in the scrambling of a portion of the original signal recorded during a first recording interval, the first descrambling information representing contents of the key information piece used in the scrambling as the scrambling key information piece and also representing which of the different key information pieces the first descrambling information currently corresponds to, the first descrambling information being recorded during a second recording interval being longer than the first recording interval and containing the first recording interval, the method comprising the steps of:

reproducing the signal from the recording medium;

detecting the first descrambling information in the signal reproduced from the recording medium;

detecting the second descrambling information in the signal reproduced from the recording medium;

generating descrambling keys in response to the detected first descrambling information;

selecting one of the descrambling keys in response to the detected second descrambling information;

separating the scrambling-resultant signal from the signal reproduced from the recording medium; and descrambling the separated scrambling-resultant signal in response to the selected descrambling key.

6. An apparatus for reproducing a signal from a recording medium, wherein a signal recorded on the recording medium includes a scrambling-resultant signal, first descrambling information, and second descrambling information, the scrambling-resultant signal resulting from scrambling of an original signal in response to a scrambling key information piece which is periodically changed among a plurality of different key information pieces, the second descrambling information representing which of the different key information pieces is used as the scrambling key information piece in the scrambling of a portion of the original signal recorded during a first recording interval, the first descrambling information representing contents of the key information piece used in the scrambling as the scrambling key information piece and also representing which of the different key information pieces the first descrambling information currently corresponds to, the first descrambling information being recorded during a second recording interval being longer than the first recording interval and containing the first recording interval, the apparatus comprising:

means for reproducing the signal from the recording medium;

means for detecting the first descrambling information in the signal reproduced from the recording medium;

means for detecting the second descrambling information in the signal reproduced from the recording medium;

means for generating descrambling keys in response to the detected first descrambling information;

means for selecting one of the descrambling keys in response to the detected second descrambling information;

means for separating the scrambling-resultant signal from the signal reproduced from the recording medium; and means for descrambling the separated scrambling-resultant signal in response to the selected descrambling key.

7. An apparatus for recording a signal on a recording medium, comprising:

first means for periodically changing a scrambling key information piece among a plurality of different key information pieces;

second means for scrambling an input signal into a scrambling-resultant signal in response to the scrambling key information piece periodically changed by the first means;

third means for generating descrambling information representing which of the different key information pieces is currently used by the first means as the scrambling key information piece; and fourth means for recording the scrambling-resultant signal, the different key information pieces, and the descrambling information on the recording medium;

wherein each of the different key information pieces is used by the first means as the scrambling key information piece during a first time interval, and is recorded by the fourth means during a second time interval longer than the first time interval.

8. A method of reproducing a signal from a recording medium, wherein a signal recorded on the recording medium includes a scrambling-resultant signal, first descrambling information, and second descrambling information, the scrambling-resultant signal resulting from scrambling of an original signal in response to a scrambling key information piece which is periodically changed among a plurality of different key information pieces including first and second key information pieces, wherein a portion of the scrambling-resultant signal which results from the scrambling in response to the first key information piece is recorded on a first recording interval in the recording medium, and a portion of the scrambling-resultant signal which results from the scrambling in response to the second key information piece is recorded on a second recording interval in the recording medium, wherein the first key information piece is recorded on the first and second recording intervals, and the second key information piece is recorded on the first recording interval, wherein the first and second recording intervals are different from each other, wherein the first descrambling information represents the periodically changed scrambling key information piece used for the scrambling, and the second descrambling information represents which of the first and second key information pieces the periodically changed scrambling key information piece used for the scrambling corresponds to, the method comprising the steps of:

reproducing the signal from the recording medium;

detecting the first descrambling information in the signal reproduced from the recording medium;

detecting the second descrambling information in the signal reproduced from the recording medium;

generating descrambling keys in response to the detected first descrambling information;

selecting one of the descrambling keys in response to the detected second descrambling information;

separating the scrambling-resultant signal from the signal reproduced from the recording medium; and     descrambling the separated scrambling-resultant signal in response to the selected descrambling key.

9. An apparatus for reproducing a signal from a recording medium, wherein a signal recorded on the recording medium includes a scrambling-resultant signal, first descrambling information, and second descrambling information, the scrambling-resultant signal resulting from scrambling of an original signal in response to a scrambling key information piece which is periodically changed among a plurality of different key information pieces including first and second key information pieces, wherein a portion of the scrambling-resultant signal which results from the scrambling in response to the first key information piece is recorded on a first recording interval in the recording medium, and a portion of the scrambling-resultant signal which results from the scrambling in response to the second key information piece is recorded on a second recording interval in the recording medium, wherein the first key information piece is recorded on the first and second recording intervals, and the second key information piece is recorded on the first recording interval, wherein the first and second recording intervals are different from each other, wherein the first descrambling information represents the periodically changed scrambling key information piece used for the scrambling, and the second descrambling information represents which of the first and second key information pieces the periodically changed scrambling key information piece used for the scrambling corresponds to, the apparatus comprising:

means for reproducing the signal from the recording medium;

means for detecting the first descrambling information in the signal reproduced from the recording medium;

means for detecting the second descrambling information in the signal reproduced from the recording medium;

means for generating descrambling keys in response to the detected first descrambling information;

means for selecting one of the descrambling keys in response to the detected second descrambling information;

means for separating the scrambling-resultant signal from the signal reproduced from the recording medium; and     means for descrambling the separated scrambling-resultant signal in response to the selected descrambling key.

10. A recording medium storing a signal including a scrambling-resultant signal, first descrambling information, and second descrambling information, the scrambling-resultant signal resulting from scrambling of an original signal in response to a scrambling key information piece which is periodically changed among a plurality of different key information pieces including first and second key information pieces, wherein a portion of the scrambling-resultant signal which results from the scrambling in response to the first key information piece is recorded on a first recording interval in the recording medium, and a portion of the scrambling-resultant signal which results from the scrambling in response to the second key information piece is recorded on a second recording interval in the recording medium, wherein the first key information piece is recorded on the first and second recording intervals, and the second key information piece is recorded on the first recording interval, wherein the first and second recording intervals are different from each other, wherein the first descrambling information represents the periodically changed scrambling key information piece used for the scrambling, and the second descrambling information represents which of the first and second key information pieces the periodically changed scrambling key information piece used for the scrambling corresponds to.

11. An apparatus for recording a signal on a recording medium, comprising:

first means for periodically changing a scrambling key information piece among a plurality of different key information pieces including first and second key information pieces;

second means for scrambling an input signal into a scrambling-resultant signal in response to the scrambling key information piece periodically changed by the first means;

third means for generating descrambling information representing which of the first and second key information pieces is currently used by the first means as the scrambling key information piece; and     fourth means for recording a portion of the scrambling-resultant signal which results from the scrambling in response to the first key information piece on a first recording area in the recording medium, recording a portion of the scrambling-resultant signal which results from the scrambling in response to the second key information piece on a second recording area in the recording medium, recording the first key information piece on the first and second recording areas, recording the second key information piece on the first recording area, and recording the descrambling information on the recording medium, wherein the first and second recording areas are different from each other.

12. An apparatus as recited in claim 11, wherein the first key information piece is recorded on a zone in the recording medium, the zone covering the first recording area and having a length equal to twice that of the first recording area.

* * * * *